March 21, 1961 J. F. PRIBONIC ET AL 2,976,053
HEIGHT CONTROL VALVE FOR VEHICLE SUSPENSION
Filed July 23, 1958 4 Sheets-Sheet 2

INVENTORS
JOHN F. PRIBONIC
WAYNE A. KARLGAARD
BY
C. D. C. Staley
THEIR ATTORNEY

INVENTORS
JOHN F. PRIBONIC
WAYNE A. KARLGAARD
BY D. C. Staley
THEIR ATTORNEY

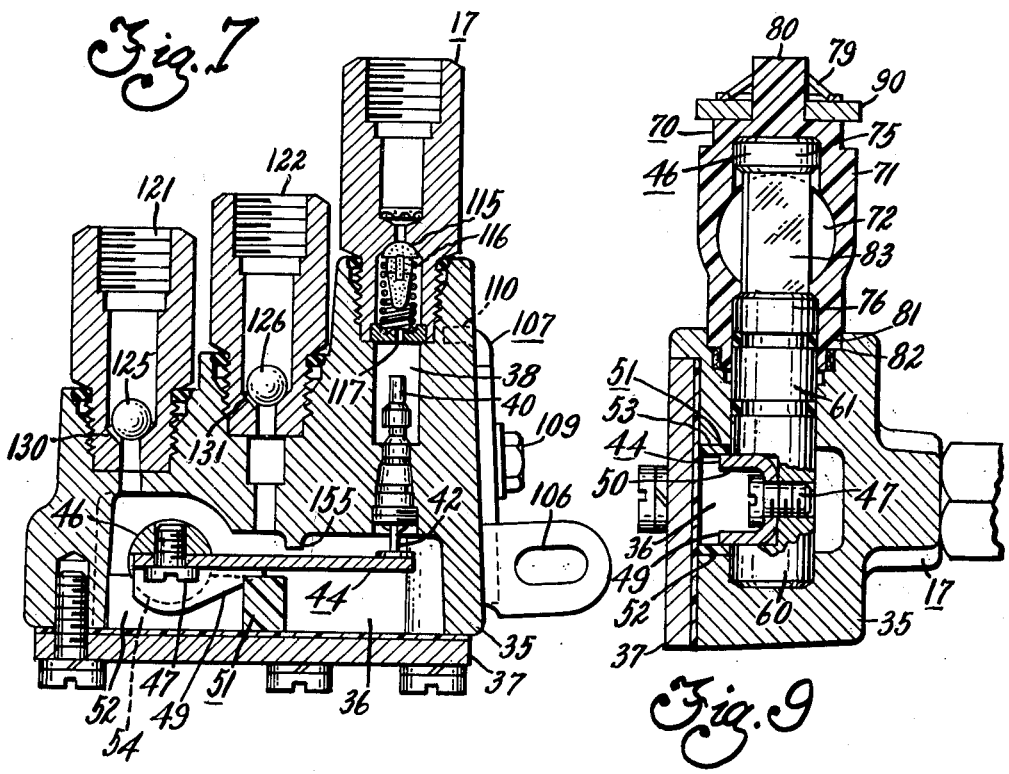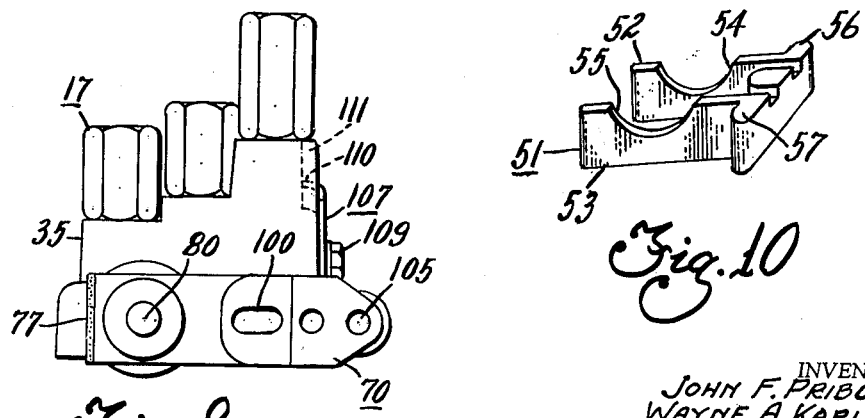

United States Patent Office 2,976,053
Patented Mar. 21, 1961

2,976,053

HEIGHT CONTROL VALVE FOR VEHICLE SUSPENSION

John F. Pribonic, Dayton, and Wayne A. Karlgaard, Englewood, Ohio, assignors to General Motors Corporation, Detroit, Mich., a corporation of Delaware Filed July 23, 1958, Ser. No. 750,416

18 Claims. (Cl. 280—124)

This invention relates to control valve means adapted for controlling the flow of air under pressure to and from an air spring positioned between the sprung mass and the unsprung mass of a vehicle, the control valve being adapted for actuation in response to a change in clearance height between the sprung mass and the unsprung mass of a vehicle whereby to maintain the clearance height between the sprung mass and the unsprung mass at a relatively constant value.

Motor vehicles of various types, particularly passenger cars, trucks and busses, are being supplied with air springs positioned between the sprung mass and the unsprung mass of the vehicle to support the sprung mass upon the unsprung mass, the air springs or fluid springs replacing coil springs and leaf springs heretofore used in such vehicles.

The air springs comprise a chamber containing air under pressure with at least one wall of the chamber being expansible and movable relative to the remaining part of the chamber whereby the sprung mass may move relative to the unsprung mass. The air chamber receives sufficient air pressure normally to maintain a predetermined clearance height between the sprung mass and the unsprung mass of the vehicle and thereby support the sprung mass upon the unsprung mass in a static condition, whereby the body of the vehicle will be maintained at a predetermined clearance height above the axle of the vehicle.

Control valve means are provided for regulating the supply of air to the air spring and exhaust of air from the air spring to change the pressure value of air within the air spring in response to the load requirement of the spring mass. That is, as the load within the body of the vehicle, or the sprung mass, increases, the pressure of the air within the air spring will be increased to a value whereby the predetermined clearance height is maintained relatively constant regardless of the load increase. Similarly, upon a decrease of load in the sprung mass of the vehicle the air pressure within the air spring will be reduced so that the clearance height between the spring mass and the unsprung mass will remain at a relatively constant value. This control of the flow of air pressure into the air spring and exhaust of air from the air spring is regulated by control valves that are actuated in response to a change in clearance height between the sprung mass and the unsprung mass so that the valve will open to allow air to flow into the air spring when the clearance height is below a predetermined value and will allow air to exhaust from the air spring when the clearance height is above a predetermined value.

It is an object of this invention to provide an improved and simplified form of air pressure control valve that is actuated in response to a change in the clearance height between the sprung mass and the unsprung mass of a vehicle for regulating and maintaining the clearance height relatively constant irrespective of load conditions in the body or the sprung mass of the vehicle.

In control valves of the type just mentioned, it is desirable that the valve actuating means that controls the opening and closing of the fluid inlet and exhaust valves of the control valve be restricted to a predetermined small increment of movement relative to the total movement of the axle of the vehicle so that the control valve will be relatively sensitive to changes in clearance height of the vehicle. However, the axle movements of the vehicle will be much greater than the limited movement of the valve actuating element so that it is necessary to provide an overtravel mechanism positioned between the actuating arm that connects with the axle or the body of the vehicle so that the large movements caused by normal road operating conditions of the vehicle will be absorbed without being transferred to the valve actuating device, the overtravel mechanism incorporating a resilient mechanism whereby the actuating arm of the control device is allowed to move to a much greater extent than the valve device with the result that the valve device is unharmed by the large movements normally created between the sprung mass and the unsprung mass of the vehicle.

It is also an object of this invention to provide an improved and simplified form of overtravel mechanism positioned between the control arm of the valve and the valve device to allow for greater movement of the axle of the vehicle relative to the body than that which is occasioned in the valve device.

It is another object of the invention to provide a control valve for regulating the air pressure to and from an air spring wherein the control valve and the overtravel mechanism associated therewith have means for establishing a predetermined spatial position between the overtravel mechanism and the valve device with the inlet and exhaust valves of the valve device both in closed position, this position of the overtravel mechanism relative to the control device being the normal neutral position of the valve control mechanism at which the vehicle normally stands in static condition and under body load only.

A further object of the invention is to provide an air control valve mechanism wherein the valve mechanism consists of a valve body having a fluid receiving chamber that is supplied with fluid from which fluid can be exhausted through inlet and exhaust valve means that are actuated by an actuating member attached to an oscillatable shaft that is journalled in the valve body, the oscillatable shaft extending from the valve body through a seal arrangement so that the external portion of the shaft is arranged to carry an overtravel mechanism that supports an operating arm connected with the body or axle of the vehicle, the overtravel mechanism allowing the actuating arm to move in a greater arc of rotation than the shaft which actuates the inlet and exhaust valve means, the actuating member for the inlet and exhaust valve means being controlled between limit stops to regulate maximum movement of the actuating elements.

A further object of the invention is to provide a valve actuating device incorporating the features of the foregoing objects wherein the operating arm carried by the overtravel mechanism is adjustably positioned on the overtravel mechanism so that there can be spatial adjustment of the operating arm relative to the overtravel mechanism to compensate for mechanical manufacturing variations in placement of the valve mechanism on the vehicle and connecting of the operating arm to the body or the axle of the vehicle.

Still another object of the invention is to provide a valve control device wherein the valve body is provided with an inlet and an exhaust passage which receives inlet and exhaust valves for control of the flow of air into the air receiving chamber in the valve body, the inlet passage in the valve body being provided with a check valve that permits free flow of air into the valve body but which prevents return flow of air from the valve body, an orifice restriction also being provided in the inlet passage between the check valve and the inlet control valve whereby the flow of air in either direction through the inlet passage is regulated by the maximum air flow allowed through the restriction orifice passage. The valve body is also provided with an exhaust passage that has a flow control valve that is in series arrangement with an orifice restriction in the exhaust passage which restricts the flow of air from a receiving chamber in the valve body when the exhaust valve is open. The valve body is also provided with two supply passages that are adapted to be connected with two separate air springs for supply of air to the air springs and exhaust of air from the air springs as controlled by the inlet and exhaust valves of the control device, each of the supply passages being provided with a check valve that permits free flow of air to the air springs and prevents return air flow from the air springs into the control valve, the feature of the check valve means being provided with a restriction passage which by-passes the check valve so that a restricted air flow can be obtained from the air spring back into the fluid receiving chamber of the control valve, the check valves in the air supply passages to the air springs being so arranged as to prevent free flow of air between connected air springs during a period when the vehicle is rounding a curve.

Further objects and advantages will be apparent from the drawings and following descriptions.

In the drawings:

Fig. 7 is a cross-sectional view of the control valve taken along line 7—7 of Fig. 2 showing particularly the air inlet passage through a control valve and the supply passages adapted for connection with the air spring.

Fig. 8 is a side elevational view of the control valve with the operating arm connectable with the axle of the vehicle removed to show the overtravel mechanism.

Fig. 9 is a cross-sectional view taken along line 9—9 of Fig. 5.

Fig. 10 is a perspective elevational view of one of the parts of the central valve.

Figure 1:
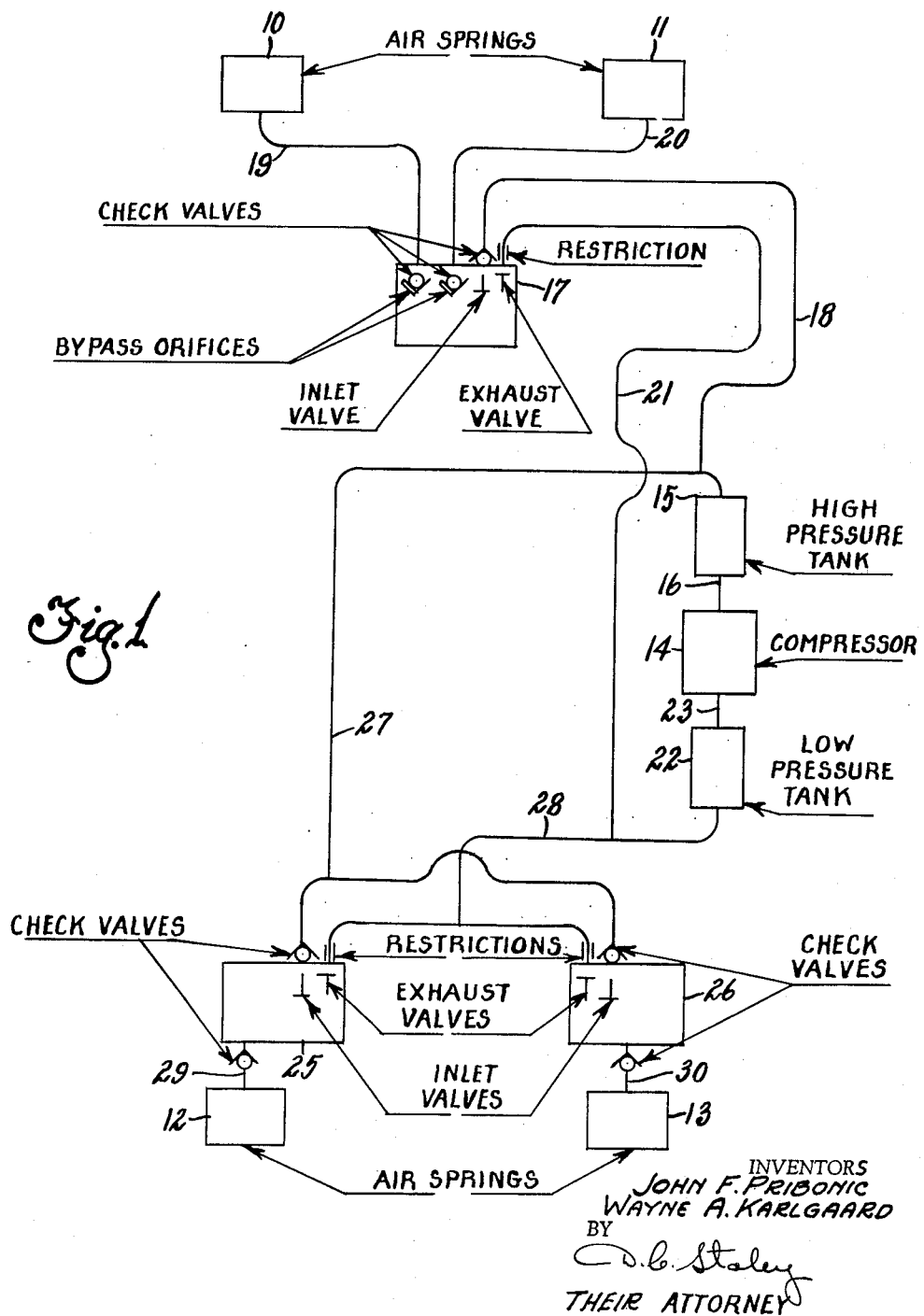
Fig. 1 is a schematic view of an air suspension system on a motor vehicle incorporating the control valve of this invention.
Figure 2:
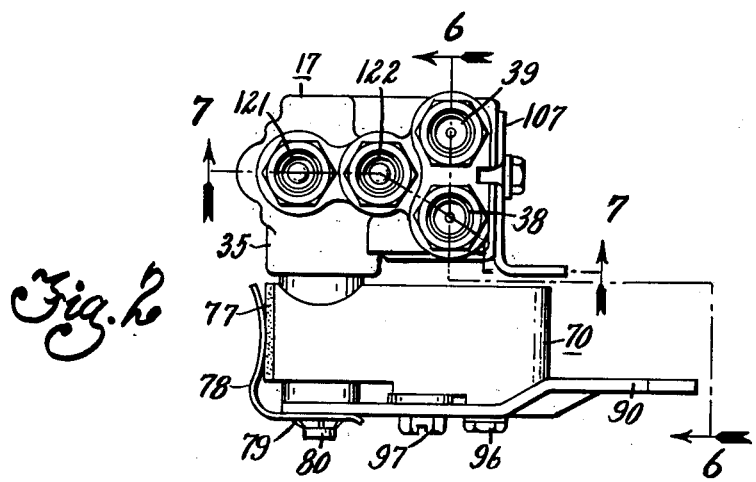
Fig. 2 is a top elevational view of the control valve.
Figures 3, 4:
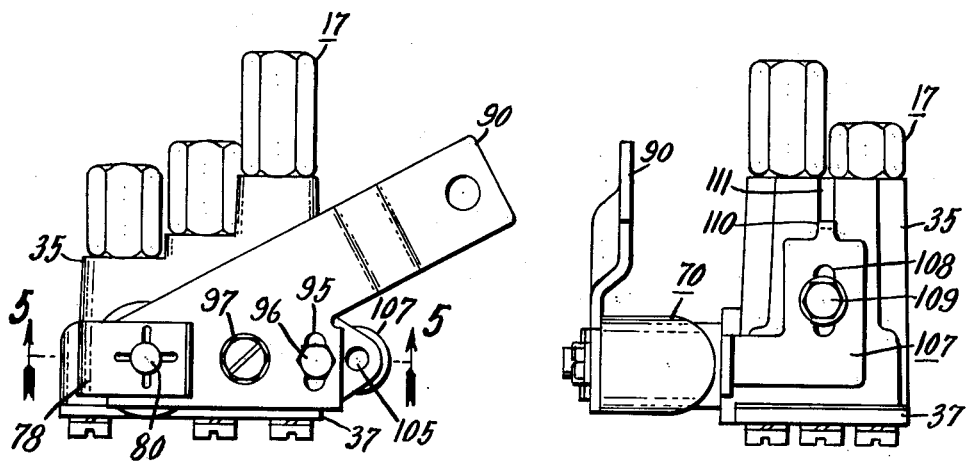
Fig. 3 is a side elevational view of the control valve.
Fig. 4 is an end elevational view of the control valve.

In this invention Fig. 1 illustrates a schematic air suspension system adapted for use on a motor vehicle wherein air springs or fluid springs are provided between the axle and body of the vehicle, that is between the sprung mass and the unsprung mass, and the air is supplied to the air springs under control of the air control valve of this invention as well as exhaust of air under control of the control valve of this invention.

In the schematic air suspension system for the motor vehicle, there is provided air springs 10 and 11 positioned at the forward end of the vehicle between the axle and body of the vehicle. Similarly, air springs 12 and 13 are positioned between the rear axle and body of the vehicle whereby the sprung mass, or body, of the vehicle is supported upon the four air springs relative to the unsprung mass, that is the axle of the vehicle.

Air under pressure is supplied to the air suspension system by means of a compressor 14 that is driven in any suitable manner, preferably being belted from the engine of the vehicle. The compressor delivers air under pressure into a high-pressure supply tank 15 through the line 16 and air under pressure is supplied to the control valve 17 by means of the line 18. The control valve 17 is of the type illustrated in more detail in the drawings hereinafter described and is adapted to regulate the flow of air to the air springs through the lines 19 and 20 respectively, the one valve 17 providing control of the air to both forward air springs 10 and 11. Exhaust of air from the air springs 10 and 11 is also under control of the control valve 17 with the exhaust of air being delivered to the line 21 through the low-pressure tank 22 which, in turn, is connected with the inlet side of the compressor by the line 23.

Air control valve or height control valve 25 controls supply of air to the air spring 12 and control valve 26 regulates the supply of air to the air spring 13. The control valves 25 and 26 are connected with the high-pressure supply tank through the line 27 for supply of air under pressure to the air springs 12 and 13 under control of the valves 25 and 26 respectively. The exhaust of air from the air springs 12 and 13 is also under regulation of the control valves 25 and 26 with the exhaust air returning to the low-pressure tank through the line 28.

The control valves 25 and 26 are identical in all respects with the control valve 17 except that control valve 17 is provided with two supply passages that connect with the lines 19 and 20 supplying the two air springs 10 and 11 under control of one height control valve 17, whereas the height control valves 25 and 26 each have a single supply passage that connects with the lines 29 and 30 respectively whereby each of the valves 25 and 26 supply the separate air springs 12 and 13. However, the functioning of the control valves 25 and 26 is identical with the control valve 17, and the description hereinafter given with regard to the control valve is more specific to valve 17 whereby the two fluid springs 10 and 11 are under control of the one control valve.

The height control valve 17 consists of a valve body 35 that has an air receiving chamber 36 closed by a cover member 37. An air inlet passage 38 is provided for supply of air under pressure into the air receiving chamber 36, the air inlet passage being connected with the line 18 for supply of the fluid under pressure from the high-pressure tank 15. The control valve is also provided with an exhaust passage 39 that connects with the exhaust line 21 for return of air to the low-pressure tank 22 and thence to the compressor 23.

Figure 5:
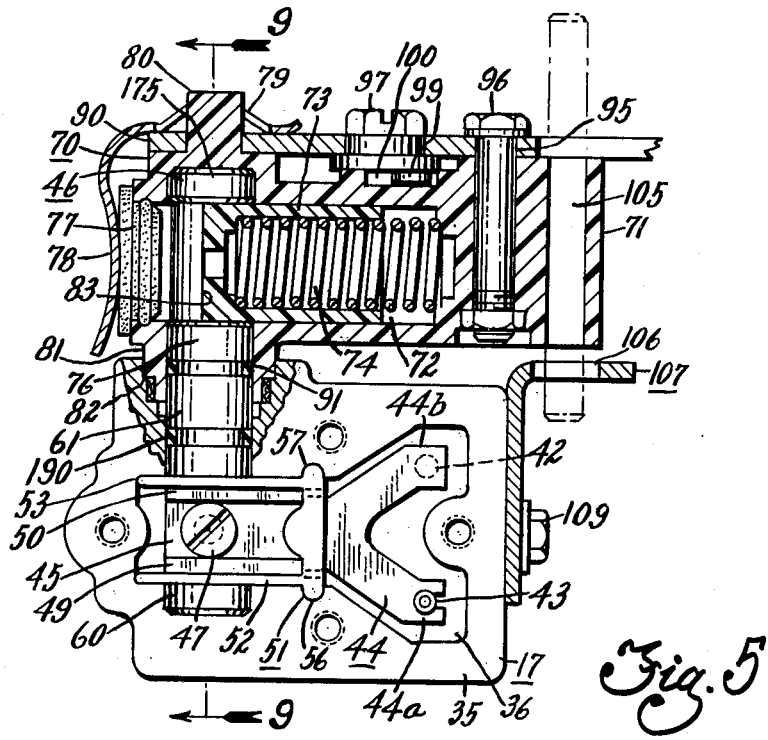
Fig. 5 is a cross-sectional view of the control valve taken along line 5—5 of Fig. 3.
Figure 6:
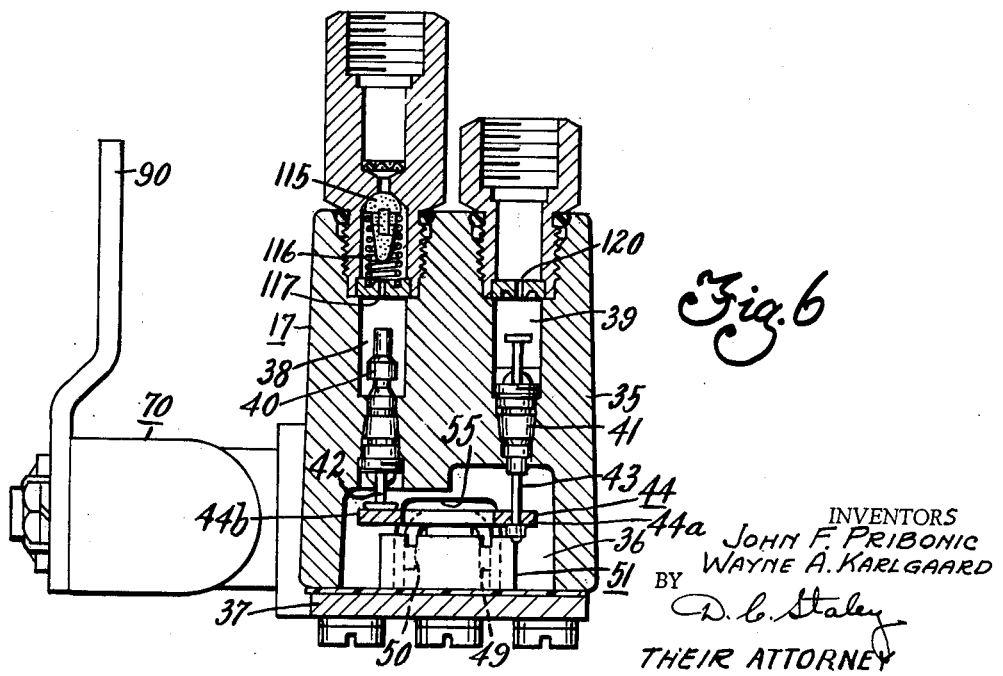
Fig. 6 is a cross-sectional view of the control valve taken along line 6—6 of Fig. 2.

The air inlet passage 38 has a flow control valve 40 that is of the normal tire valve variety with the valve 40 being positioned such that flow of air from the passage 38 into the air receiving chamber 36 is normally cut off by the valve 40. A similar flow control valve 41 is placed in the exhaust passage 39 and is also of the common tire valve type and is disposed in the passage 39 in a manner that flow of air from the air receiving chamber 36 into the exhaust passage 39 is cut off. The control valve 40 has an actuating stem 42 projecting into the air receiving chamber 36 and, similarly, the valve 41 has an actuating stem 43 extending into the chamber 36. The actuating stems 42 and 43 are connected to a valve actuating member 44 that is Y-shaped as illustrated in Fig. 5 with the arm 44a being connected with the stem 43 of the exhaust valve 41 and the arm 44b being connected with the stem 42 of the inlet valve 40.

The stem portion 45 of the valve actuating member 44 is secured to an oscillatable shaft 46 on a flat portion on the shaft by means of the screw 47. The attachment of the stem portion 45 of the actuating member 44 is more specifically illustrated in Fig. 9.

The actuating arm 44 has the shoulders 49 and 50 along opposite edges of the stem portion 45 of the actuating member 44, these shoulders 49 and 50 being positioned in parallel relation and being adapted to prevent axial movement of the shaft 46 within the valve body in cooperation with the thrust and stop limit member 51.

As more specifically shown in Fig. 10, the stop limit member 51 is substantially U-shaped and has the arms 52 and 53 provided with edge recesses 54 and 55 that are positioned over the shaft 46 and between the shoulders 49 and 50 on the stem 45 of the actuating member 44 and the body of the valve member so that the walls 52 and 53 of the member 51 form thrust walls to receive the axial thrust of the shaft 46. This member 51 is made of nylon which is self lubricating and, therefore, provides for lubrication of the thrust surfaces formed by the shoulders 49 and 50 as they work against the arms 52 and 53 with the arms working against the body of the valve device.

The thrust member 51 is also provided with ridges 56 and 57 that are received in parallel ridges in the valve body so that the member 51 is positioned in a specific relationship relative to the valve body and with respect to the valve actuating member 44.

As more particularly shown in Fig. 7, the member 51 provides the stop limit for movement of the actuating arm 44 in one direction, and the wall 155 of the valve body forms the limit stop for the actuating member 44 in the opposite direction. Thus the total movement of the actuating member 44 is controlled within narrow limits to regulate the maximum degree of movement of the valve members 40 and 41 to avoid overtravel of the valve members which would result in damage of these valve members if such overtravel were allowed.

The oscillatable shaft 46 has the end 60 journaled in the valve body 35 and has the mid portion 61 journaled in the valve body on the opposite side of the chamber 36. The shaft 46 extends externally of the valve body 35 and has an overtravel mechanism 70 supported on the end of the shaft 46.

The overtravel mechanism 70 consists of a body 71 that has a cylindrical chamber 72 receiving a piston 73 that is urged by the compression spring 74 against the flat surface 75 on the shaft 46 whereby the shaft 46 is retained in a predetermined position relative to the body 71 of the overtravel mechanism 70. The body of the overtravel mechanism is supported on the shaft 46 by the shaft having the end 175 journaled in the body 71 and a portion 76 also journaled in the body 71. Thus the body 71 of the overtravel mechanism is free for rotation upon the shaft 46, that is upon the end portion thereof that projects outside the valve body 35, except as restrained by the spring urged piston 73. The cylindrical opening 72 in the body 71 is closed by a cap member 77 that is held on the end of the body by means of a spring 78 that has a friction portion 79 securing the spring 78 on the projection 80 that extends from the body 71 of the overtravel mechanism.

The overtravel mechanism 70 has a cylindrical projection 81 that is rotatably received within a corresponding cylindrical recess 82 in the valve body 35 whereby the cooperation of the peripheral surfaces of the projection 81 and the recess 82 form a sliding seal to prevent entry of dirt into the journal area of the shaft 46. An O ring seal 190 is provided on the shaft to prevent loss of air under pressure from the chamber 36 and an O ring seal 91 is provided to prevent entry of dirt into the interior of the overtravel mechanism which would tend to resist operation of the piston 73 within the cylinder 72.

From the foregoing description it will be quite apparent that when the overtravel mechanism 70 is actuated by the operating arm 90 that is carried on the member 70 to effect oscillation of the shaft 46, the shaft 46 will be oscillated by up and down travel of the overtravel mechanism 70 because of the urgence of the piston 73 against the flat portion 83 on the shaft 46, the piston tending to hold the body of the overtravel mechanism in a predetermined position relative to the shaft 46 to effect oscillation of the shaft 46 within the limits of movement allowed to the shaft 46 by the valve actuating device 44 which operates between the limit stops 55 and 51.

When the overtravel mechanism is urged to move upwardly or downwardly to an extent greater than the movement allowed by the valve actuating arm 44, the piston 73 will be moved backwardly against the compression spring 74 by the flat portion 83 so as to allow the overtravel mechanism 70 to move to any extent necessary that the operating arm 90 can move with the axle or with the body of the vehicle depending on which part the member 90 is connected to.

The operating arm 90 that actuates the overtravel mechanism 70 and thereby the valve control device 44 is adjustably positioned on the overtravel mechanism 70 so that any mechanical variation between the position of the valve on the body of the vehicle and connection of the arm 90 with the axle of the vehicle can be compensated. For this purpose the arm 90 is pivotally carried on the projection 80 and is held on the projection by means of the friction connection 79. The arm 90 is provided with a slot 95 through which the bolt 96 extends so as to allow movement of the arm 90 relative to the body of the overtravel mechanism.

The adjustment is effected by means of the eccentric adjusting device 97 which is positioned between the arm 90 and the body of the overtravel mechanism, the eccentric device 97 having an eccentric pin 99 that rides in a longitudinally extending recess 100 in the body 71 of the overtravel mechanism so that rotation of the eccentric device 97 will effect movement of the arm 90 relative to the body of the overtravel mechanism and provide for spatial adjustment of the arm 90 relative to the body of the overtravel mechanism to compensate for any mechanical variation between the parts of the motor vehicle.

When making the initial factory set up of the valve control device, it is desirable to position the overtravel mechanism 70 in a spatial position relative to the valve body 35 so that the overtravel mechanism will be positioned in a predetermined relation relative to the valve body 35 when both inlet and exhaust valves 40 and 41 are in closed position, that is establish the neutral position of the valve device, which neutral position of the valve device can thereafter be re-established at any time the valve is removed from the vehicle for repair or during installation of the valve device on the vehicle at time of initial manufacture of the vehicle.

To establish this spatial position of the overtravel mechanism relative to the valve device 35, the body 71 of the overtravel mechanism is provided with an opening 105 that is adapted to align with an opening 106 in an adjustable bracket 107 carried on the valve body 35. The adjustable bracket 107 is provided with a slot 108 whereby the bracket can be moved upon the valve body and is secured to the valve body by a bolt 109. The bracket 107 is prevented from rotation on the valve body by the ear 110 operating in the slot 111 in the valve body.

When making the initial neutral adjustment of the overtravel mechanism 70 relative to the valve body 35, a pin (shown in dot-dash lines) is inserted in the opening 105 of the overtravel mechanism and extends into the opening 106 in the adjusting bracket 107. With the inlet and exhaust valves disposed in closed position, according to a test fixture, the adjustable bracket is moved relative to the overtravel mechanism so that the opening 106 will align with the opening 105 and an aligning pin can be inserted through the openings. Thereafter the adjustable bracket 107 is secured in position by tightening the bolt 109. At any time the valve is removed from the vehicle, or at any time during its initial installation on the vehicle, the neutral position of the overtravel mechanism relative to the valve body 35 can be readily established merely by inserting a pin between the openings 105 and 106, as described.

The valve body 35 having the inlet passage 38 is also provided with a check valve 115 in the inlet passage 38. This check valve 115 is spring urged against its seat by a spring 116 so that air under pressure can flow from the line 18 into the inlet passage 38 but air cannot return from the passage 38 back into the line 18. This is a safety feature from the standpoint that if line 18 should rupture for any reason, air will not be lost from the air spring.

Also, a restriction orifice 117 is provided in the air passage 38 between the check valve 115 and the flow control valve 40 so as to restrict and control the maximum flow of air in either direction through the air passage and thereby regulate the maximum amount of air that can be delivered into the air spring under any condition.

Similarly, the exhaust passage 39 is provided with a restrictive orifice 120 that controls the maximum exhaust flow of air from the valve 41 at any time the exhaust valve is open.

The valve body 35 is provided with two air supply passages 121 and 122 that connect respectively with the lines 19 and 20 for supply of fluid of air under pressure to the air springs 10 and 11 and allow for exhaust of air from the air springs 10 and 11 back into the air receiving chamber 36 in the valve body. These passages 121 and 122 both connect with the air receiving chamber 36 so that air is supplied simultaneously to both forward air springs 10 and 11. A check valve 125 is provided in the air supply passage 121 to allow free flow of air into the air spring 19. Similarly, a check valve 126 is provided in the air supply passage 122 to allow free flow of air into the other front air spring 11.

The check valves 125 and 126 prevent return of air from the air springs 10 and 11 back into the air receiving chamber 36 of the valve 35 so that there will be no direct flow of air from the air spring 10 into the air spring 11 or vice versa through the medium of the air receiving chamber 36 in the event of roll of the vehicle, under which condition the balance of air pressures in the air springs 10 and 11 is unbalanced for a temporary time period during the time the vehicle is rounding a curve.

However, it is not desirable to completely restrict the air flow from passing between the two forward air springs 10 and 11 so that the check valve 125 is provided with a restrictive passage 130 in the valve seat for the check valve. Similarly, the check valve 126 is provided with a restrictive passage 131. Thus, when air tends to flow from the air spring 10 into the air spring 11, the restrictive passage 130 will restrict the air flow but will not provide for stiff leggedness of the front end of the vehicle. Similarly, the restrictive passage 131 will allow for some flow of air from the air spring 11 into the air spring 10 when the vehicle rolls in the opposite direction.

While the embodiments of the present invention as herein disclosed constitute a preferred form, it is to be understood that other forms might be adopted.

What is claimed is as follows:

1. A height control or leveling valve for use in a fluid suspension system for a vehicle to maintain a predetermined clearance height between the sprung mass and the unsprung mass of the vehicle by supplying fluid under pressure to a fluid spring in response to a decrease of the predetermined clearance height and exhausting fluid from the fluid spring in response to an increase of the predetermined clearance height, comprising, a valve body having a fluid receiving chamber, inlet and exhaust valve means in said body controlling fluid flow to and from said chamber, an oscillatable shaft journaled in said body having a portion within said chamber and a portion extending exteriorly of said body, a valve actuating arm in said chamber and secured on said shaft portion in said chamber for oscillation with said shaft and having free ends engageable with said inlet and exhaust valve means to actuate the same by oppositely directed movements of the actuating arm, said valve actuating arm having shoulder means thereon forming thrust shoulders to position the said shaft transversely within said valve body and form thrust means to receive axial thrust of said shaft and prevent removal of the shaft from the said body, a hollow body member supported on said shaft portion exterior of said valve body and freely rotatable on said shaft, said body member containing therein a spring urging a member therein against a flat portion on said shaft portion within said hollow body member for resiliently positioning said hollow body member in a predetermined position relative to said shaft and thereby relative to said valve actuating arm and also providing for resilient movement of said hollow body member relative to said shaft and said valve actuating arm beyond the limits of movement of said valve actuating arm, and means on said hollow body member for connecting the same with the sprung or unsprung mass of a vehicle to actuate the same and said valve actuating arm in response to relative movement between the sprung mass and the unsprung mass of the vehicle.

2. A height control or leveling valve for use in a fluid suspension system for a vehicle to maintain a predetermined clearance height between the sprung mass and the unsprung mass of the vehicle by supplying fluid under pressure to a fluid spring in response to a decrease of the predetermined clearance height and exhausting fluid from the fluid spring in response to an increase of the predetermined clearance height, comprising, a valve body having a fluid receiving chamber, inlet and exhaust valve means in said body controlling fluid flow to and from said chamber, an oscillatable shaft journaled in said body having a portion within said chamber and a portion extending exteriorly of said body, said shaft portion in said fluid receiving chamber extending transversely across the said chamber with the said shaft journaled in said valve body at both sides of the said chamber, said shaft having a flat portion thereon within said chamber on which one end of a valve actuating arm is affixed to provide for oscillation of the arm with the shaft, a valve actuating arm in said chamber and secured on said flat portion on said shaft to provide for oscillation of the arm with the shaft and having free ends engageable with said inlet and exhaust valve means to actuate the same by oppositely directed movements of the actuating arm, said actuating arm including shoulder means forming thrust shoulders engaging opposite sides of said chamber to transversely position said shaft in said body and prevent removal of the shaft from the body, a hollow body member supported on said shaft portion exterior of said valve body and freely rotatable on said shaft, said body member containing therein a spring urging a member therein against a flat portion on said shaft portion within said hollow body member for resiliently positioning said hollow body member in a predetermined position relative to said shaft and thereby relative to said valve actuating arm and also providing for resilient movement of said hollow body member relative to said shaft and said valve actuating arm beyond the limits of movement of said valve actuating arm, and means on said hollow body member for connecting the same with the sprung or unsprung mass of a vehicle to actuate the same and said valve actuating arm in response to relative movement between the sprung mass and the unsprung mass of the vehicle.

3. A height control valve or leveling valve in accordance with the structure set forth in claim 2 wherein said valve actuating arm is in the form of a Y with the stem of the arm secured on the flat portion of said shaft and the angular arms engaging said inlet and exhaust valve means respectively to actuate the same on oppositely directed movements of the actuating arm.

4. A height control or leveling valve for use in a fluid suspension system for a vehicle to maintain a predetermined clearance height between the sprung mass and the unsprung mass of the vehicle by supplying fluid under pressure to a fluid spring in response to a decrease of a predetermined clearance height and exhausting fluid from the fluid spring in response to an increase of the predetermined clearance height, comprising, a valve body having a fluid receiving chamber, inlet and exhaust valve means in said body controlling fluid flow to and from said chamber, an oscillatable shaft journaled in said body having a portion within said chamber and a portion extending exteriorly of said body, a valve actuating arm in said chamber and secured on said shaft portion in said chamber for oscillation with said shaft and having free ends engageable with said inlet and exhaust valve means to actuate the same by oppositely directed movements of the actuating arm, a substantially U-shaped member positioned between said valve actuating arm and a wall of said fluid receiving chamber and forming a limit stop for movement of said valve actuating arm in one direction of movement, said U-shaped member having the side walls thereof positioned between thrust shoulders provided on said valve actuating arm and opposite walls of said fluid receiving chamber whereby to locate said shaft transversely within said valve body and prevent removal of the shaft from the body, a hollow body member supported on said shaft portion exterior of said valve body and freely rotatable on said shaft, said body member containing therein a spring urging a member therein against a flat portion on said shaft portion within said hollow body member for resiliently positioning said hollow body member in a predetermined position relative to said shaft and thereby relative to said valve actuating arm and also providing for resilient movement of said hollow body member relative to said shaft and said valve actuating arm beyond the limits of movement of said valve actuating arm, and means on said hollow body member for connecting the same with the sprung or unsprung mass of a vehicle to actuate the same and said valve actuating arm in response to relative movement between the sprung mass and the unsprung mass of the vehicle.

5. A height control valve or leveling valve in accordance with the structure set forth in claim 4 wherein said U-shaped member is provided with ridges extending from opposite sides thereof and are slidably received in recesses in said body in opposite walls of said fluid receiving chamber to position said U-shaped member in said body with respect to said shaft.

6. A height control valve or leveling valve in accordance with the structure set forth in claim 4 wherein said U-shaped member has edge recesses in opposite parallel walls thereof in which said shaft is received to retain the said U-shaped member against movement transversely normal of said shaft.

7. A height control valve or leveling valve in accordance with the structure set forth in claim 4 wherein said U-shaped member is constructed of nylon to provide for reduction of thrust friction against the walls of said body and self lubricate the moving surfaces engaging the said U-shaped member.

8. A height control or leveling valve for use in a fluid suspension system for a vehicle to maintain a predetermined clearance height between the sprung mass and the unsprung mass of the vehicle by supplying fluid under pressure to a fluid spring in response to a decrease of the predetermined clearance height and exhausting fluid from the fluid spring in response to an increase of the predetermined clearance height, comprising, a valve body having a fluid receiving chamber, inlet and exhaust valve means in said body controlling fluid flow to and from said chamber, an oscillatable shaft journaled in said body having a portion within said chamber and a portion extending exteriorly of said body, a valve actuating arm in said chamber and secured on said shaft portion in said chamber for oscillation with said shaft and having free ends engageable with said inlet and exhaust valve means to actuate the same by oppositely directed movements of the actuating arm, a hollow body member supported on said shaft portion exterior of said valve body and freely rotatable on said shaft, said hollow body member having a cylindrical projection extending from one side thereof journaled in a cylindrical recess in said valve body surrounding said shaft with said shaft extending through said projection in journal engagement therewith to provide thereby a rotating seal between the said projection on said hollow body and said valve body against entry of dirt into said fluid receiving chamber, said body member containing therein a spring urging a member therein against a flat portion on said shaft portion within said hollow body member for resiliently positioning said hollow body member in a predetermined position relative to said shaft and thereby relative to said valve actuating arm and also providing for resilient movement of said hollow body member relative to said shaft and said valve actuating arm beyond the limits of movement of said valve actuating arm, and means on said hollow body member for connecting the same with the sprung or unsprung mass of a vehicle to actuate the same and said valve actuating arm in response to relative movement between the sprung mass and the unsprung mass of the vehicle.

9. A height control valve or leveling valve in accordance with the structure set forth in claim 8 wherein said shaft has a first annular recess in the journal portion thereof in said valve body receiving an annular resilient seal member and a second annular recess in the journal portion thereof in said projection on said hollow body receiving a second resilient annular seal member.

10. A height control valve or leveling valve for use in a fluid suspension system for a vehicle to maintain a predetermined clearance height between the sprung mass and the unsprung mass of the vehicle for supplying fluid to a fluid spring in response to a decrease of the predetermined clearance height and exhausting fluid from the fluid spring in response to an increase of the predetermined clearance height, comprising, a valve device having inlet and exhaust valves controlling fluid flow to and from the fluid spring operated by an oscillatable shaft extending from the valve device, an overtravel mechanism carried on the extending end of said shaft, an operating arm carried on said overtravel mechanism and connectable to the sprung or the unsprung mass of the vehicle to actuate said overtravel mechanism and thereby said valve device, means on said overtravel mechanism and on said valve device providing for spatial locking of the overtravel mechanism relative to said valve device with said inlet and exhaust valves in closed position, said arm having one end thereof pivoted on a projection extending from one side of said overtravel mechanism, and an eccentric means adjacent said projection and between said arm and the body of said overtravel mechanism rotatable to rotate said arm about said pivot to change the spatial position of said arm relative to the body of the overtravel mechanism.

11. A height control valve or leveling valve in accordance with the structure set forth in claim 10 wherein the said eccentric means consists of an eccentric pin operating in a slot in the body of said overtravel mechanism to effect the said rotation of the said operating arm about the said pivot.

12. A height control valve or leveling valve for use in a fluid suspension system for a vehicle to maintain a predetermined clearance height between the sprung mass and the unsprung mass of the vehicle by supplying fluid to a fluid spring in response to a decrease of the predetermined clearance height and exhausting fluid from the fluid spring in response to an increase of the predetermined clearance height, comprising, a valve body having a fluid receiving chamber, said body having inlet passage means and exhaust passage means in fluid communication with said fluid receiving chamber, said inlet and exhaust passage means having inlet and exhaust valve means in the respective passage means controlling fluid flow to and from said fluid receiving chamber, actuating means in said body engaging said inlet and exhaust valve means to actuate the same in response to a change of the predetermined clearance height between the sprung mass and the unsprung mass of the vehicle to supply fluid into said fluid receiving chamber or exhaust fluid from said fluid receiving chamber, said inlet passage means having check valve means therein positioned in series ahead of said inlet valve means in the normal direction of flow of fluid into said receiving chamber, said check valve means preventing return flow of fluid from said fluid receiving chamber back into said inlet passage means, resistance orifice passage means in said inlet passage means positioned between said check valve and said inlet valve means for restricting flow of fluid in either direction of flow through said inlet passage means, said exhaust passage means having restriction orifice means therein positioned in series ahead of said exhaust valve means in the direction of flow of fluid through said exhaust passage means for restricting flow of fluid in either direction of flow through said exhaust passage means, said valve body having a pair of fluid supply passages for supplying fluid from said fluid receiving chamber to the air springs of the vehicle, each of said fluid supply passages having check valve means therein permitting free flow of fluid to the air springs but preventing flow of fluid from the air springs back into said fluid receiving chamber, said check valve means in the said fluid supply passages each having restriction passage means to by-pass the respective check valve for restrictive flow of fluid from the air spring back into said fluid receiving chamber.

13. In a height control or leveling valve for use in a fluid suspension system for a vehicle, a valve body having a fluid receiving chamber, inlet and exhaust valve means in said body controlling fluid flow to and from said chamber, an oscillatable shaft journalled in said body having a portion within said chamber and a portion extending exteriorly of said body, a valve actuating arm in said chamber and fixed to said shaft portion in said chamber for oscillation with said shaft and having free ends engageable with said inlet and exhaust valve means to actuate the same by oppositely directed movement of the actuating arm, said valve actuating arm having shoulder means thereon adjacent to and cooperating with the said body at each of opposite sides of said arm to position the said shaft transversely within said valve body and form thrust means to receive axial thrust of said shaft and prevent axial removal of the shaft from the said body.

14. In a height control or leveling valve for use on a fluid suspension system for a vehicle, a valve body having a fluid receiving chamber, inlet and exhaust valve means in said body controlling fluid flow to and from said chamber, an oscillatable shaft journalled in said body having a portion within said chamber and a portion extending exteriorly of said body, said shaft having a flat portion thereon within said chamber on which one end of a valve actuating arm is affixed to provide for oscillation of the arm with the shaft, a valve actuating arm in said chamber and affixed on said flat portion on said shaft to provide for oscillation of the arm with the shaft and having free ends engageable with said inlet and exhaust valve means to actuate the same by oppositely directed movements of the actuating arm, said actuating arm including flange means at each of opposite sides of said arm forming thrust shoulders positioned adjacent to and cooperating with opposite sides of said chamber to transversely position said shaft in said body and prevent removal of the shaft from the body.

15. In a height control or leveling valve for use on a fluid suspension system for a vehicle, a valve body having a fluid receiving chamber, inlet and exhaust valve means in said body controlling fluid flow to and from said chamber, an oscillatable shaft journalled in said body having a portion within said chamber and a portion extending exteriorly of said body, said shaft having a flat portion thereon within said chamber on which one end of a valve actuating arm is affixed to provide for oscillation of the arm with the shaft, a valve actuating arm in said chamber and affixed on said flat portion on said shaft to provide for oscillation of the arm with the shaft and having free ends engageable with said inlet and exhaust valve means to actuate the same by oppositely directed movements of the actuating arm, said actuating arm including flange means at each of opposite sides of said arm forming thrust shoulders positioned adjacent opposite sides of said chamber, a substantially U-shaped member positioned between said valve actuating arm and a wall of said fluid receiving chamber forming a limit stop for movement of said valve actuating arm in one direction of movement, said U-shaped member having the side walls thereof positioned between said flange thrust shoulders provided on said valve actuating arm and the said opposite walls of said fluid receiving chamber whereby to locate said shaft transversely within said valve body and prevent removal of the shaft from the body.

16. A height control valve or leveling valve in accordance with the structure set forth in claim 15 wherein said U-shaped member is provided with ridges extending from opposite sides thereof and are slidably received in recesses in said body in opposite walls of said fluid receiving chamber to position said U-shaped member in said body with respect to said shaft.

17. A height control valve or leveling valve in accordance with the structure set forth in claim 15 wherein said U-shaped member has edge recesses in opposite parallel walls thereof in which said shaft is received to retain the said U-shaped member against movement transversely normal of said shaft.

18. A height control valve or leveling valve in accordance with the structure set forth in claim 15 wherein said U-shaped member is constructed of nylon to provide for reduction of thrust friction against the walls of said body and self lubricate the moving surfaces engaging the said U-shaped member.

References Cited in the file of this patent

UNITED STATES PATENTS

| | | |
|---|---|---|
| 1,058,102 | Ricketts | Apr. 8, 1913 |
| 1,188,609 | Beer | June 27, 1916 |
| 1,641,640 | Myers | Sept. 6, 1927 |
| 2,670,201 | Rossman | Feb. 23, 1954 |
| 2,711,635 | Rockwell | June 28, 1955 |
| 2,844,384 | Jackson | July 22, 1958 |
| 2,844,386 | Pribonic | July 22, 1958 |